May 22, 1962 J. T. WARKOCZEWSKI 3,035,317
MOLD CORE LOADING DEVICE
Filed Dec. 15, 1958
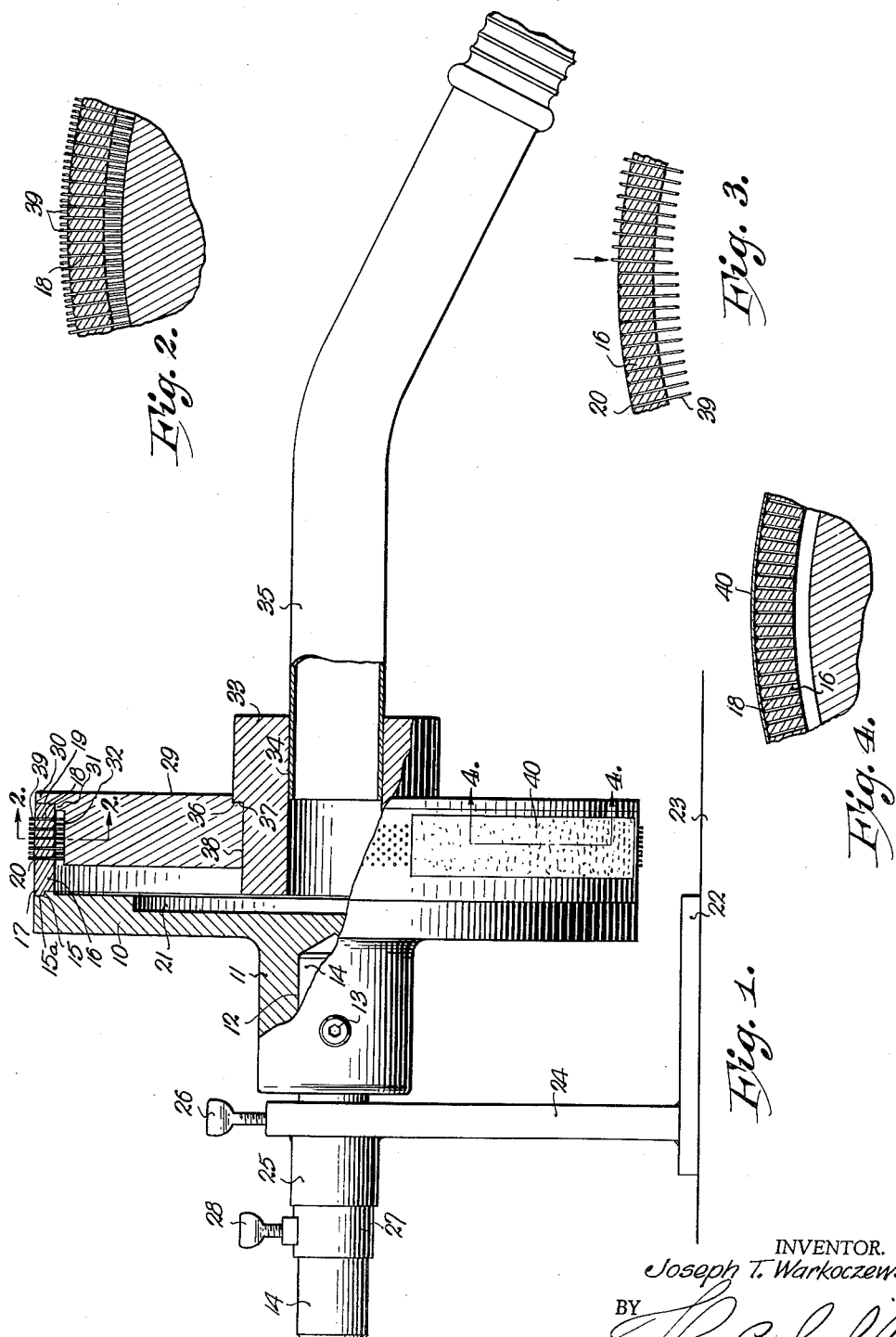
INVENTOR.
Joseph T. Warkoczewski
BY
ATTORNEY.

United States Patent Office 3,035,317
Patented May 22, 1962

3,035,317
MOLD CORE LOADING DEVICE
Joseph T. Warkoczewski, Kansas City, Mo., assignor to Gustin-Bacon Manufacturing Company, a corporation of Missouri
Filed Dec. 15, 1958, Ser. No. 780,384
7 Claims. (Cl. 22—37)

This invention relates to methods and apparatus for loading mold cores into casting molds and refers more particularly to a vacuum loading device adapted to speed up and improve the loading of relatively delicate, frangible, mold cores into a centrifugal casting mold for casting finely perforated rings.

My application Serial No. 721,491, filed March 14, 1958, entitled "Method and Apparatus for Forming Finely Perforated Rings," discloses a casting method for providing finely perforated rings of extremely hard metal. This method and apparatus includes the use of large numbers (such as 2500) delicate frangible clay-graphite or other like substance cores extending into a mold cavity.

As set forth in the above application, such cores must presently be inserted, one by one, by hand, into the openings through the mold flange wall. Conventionally this has taken about six or seven hours. Inserting the mold cores in the flange ring to exactly the right depth is difficult. Additionally, it is desired to insert the cores only a limited distance into the mold flange openings so that a later inspection can determine whether or not all of the cores have been inserted. This makes the uniform insertion problem doubly difficult.

Therefore, an object of the present invention is to provide a vacuum operated mold core loading device which will greatly speed the hand loading of casting molds, particularly centrifugal casting molds employed to cast finely perforated metal rings. The improvement in speed of loading is of a factor of three to five to one, reducing the conventional time from seven or thereabout hours to one and one-half to two hours.

Another object of the invention is to provide a vacuum operated mold core loading device which precisely and exactly positions the mold core in the desired depth of extension into the mold, either the final depth desired or a lesser depth to permit inspection of the mold before casting.

Yet another object of the invention is to provide a vacuum operated mold core loading device which may be employed with a relatively low vacuum pulled therein to successfully and speedily load mold cores into molds.

Yet another object of the invention is to provide a vacuum operated mold core loading device which greatly speeds the core loading process, is cheap and easy to manufacture, convenient to use, and has an indefinitely long life under constant and hard usage.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

FIG. 1 is a side, partly cut away and partly sectional view of a vacuum operated mold core loading device embodying the invention.

FIG. 2 is a view taken along the line 2—2 of FIG. 1 in the direction of the arrows.

FIG. 3 is a view cross-sectional through the mold flange 16 identical to that of FIG. 2 but after removal of the vacuum device showing the mold cores being individually pushed into flush relationship with the flange 16.

FIG. 4 is a view taken along the line 4—4 of FIG. 1 in the direction of the arrows.

In my application Serial No. 721,491, supra, I disclosed in FIGS. 1, 2, 9 and 10, molds adapted to be loaded by the instant invention. A typical, but not limiting, mold construction is shown in FIG. 1 of my instant application, in the process of loading cores thereinto. Base plate 10 may be formed of cast iron or like material and has base 11 centrally of the underside thereof with socket 12 formed centrally thereof. Set screw 13 is threaded into an opening to grip base 11 upon shaft 14 of the mounting and rotating device to be described. Base plate 10 is circular in plan view and has circumferential ring 15 formed thereon producing circumferential peripheral groove 15a thereby. Mold flange or ring 16 having depending lip 17 to fit into groove 15a mounts at right angles to base plate 10. A plurality of fine diameter openings are positioned extending through the ring 16 spaced above the base plate 10 and below the top 19 of the ring as shown at 18. Each opening 18 is preferably counterbored as shown at 20. A recess 21 is provided for a pouring plate of specialized material, if desired. The ring 16 mounts at right angles to the base plate 10. The outer diameter of the ring is preferably substantially that of the base plate 10. The openings 18 are preferably at right angles to the ring 16 and parallel with the face of the base plate 10.

Turning to the means for mounting the mold in preparation for loading, platform 22 rests on mounting surface 23. Upwardly extending post 24 has an opening (not shown) which receives the shaft 14 into ring 25 which is fixed to the post 24. Set screw 26 fixes or releases the shaft 14 for rotation within the post 24 and ring 25. A collar 27 having set screw 28 thereon is fixed to the outer end of the shaft 14 and regulates the extension thereof past the post 24.

Turning to the inventive vacuum loading device (the following description down to the description of operation assumes the mold 10 being in horizontal position), insert disc 29 has peripheral flange 30 of greatest diameter to rest upon the top 19 of ring 16, sealing disc portion 31 to abut against the inside surface of ring 16 below the top of the ring 16 and above the uppermost opening 18 and spacing disc portion 32 which, when the insert disc 29 is in position of FIG. 1 extends across the entire area populated by openings 18 and is spaced inwardly a measured distance from the inside face of ring 16. Insert plug 33 has opening 34 centrally thereof to receive vacuum connection 35. Insert plug 33 has shelf 36 which rests in groove 37 of opening 38 through the insert disc 29. The insert plug 33 preferably extends to a level substantially equal to the level of the inside face of bottom plate 10, whereby the vacuum line 35 draws from the space normally occupied by the pour plate in recess 21. However, this spacing of the plug 33 may be varied, as described. The plug 33 is preferably centrally positioned of disc 29. The outer diameter of disc portion 31 is preferably substantially equal to the inner diameter of ring 16 whereby to provide a friction sliding fit. The spacing of the disc portion 32 on the inside face of ring 16 is preferably slightly less than the desired extension of the cores 39 into the mold during the pouring process, whereby during the loading process, the cores will extend outwardly from the outer face of the ring 16 a slight distance to permit easy ascertainment of whether or not the individual core openings have each been loaded.

The operation of the inventive device comprises the positioning of the mold on the shaft 14 with the latter in a fixed horizontal position so that a certain portion of the holes 18 are upwardly extending. If a vacuum connection 35 is limited in its exhausting ability, a portion of the mold holes may be masked with tape as shown at 40 in FIG. 1. This causes air to pass in through only a limited number of holes 18. The insert disc 29 may be inserted into the mold with the portion 32 opposite the holes 18, the portion 31 abutting the upper inside face of the ring 19 and the flange portion 30 tightly lying against the top 19 of the ring 16. Vacuum is then pulled through line 35. By merely holding the cores in a substantially vertical position or parallel to the openings in which they are to be fed, the operator can pass a number of cores over the openings, and one core will be sucked into each opening. As the cores are spaced as shown in FIG. 1 and FIG. 2 by the disc portion 32, all of the cores are left protruding a fixed distance from the surface of the mold and the loaded condition of the mold may be easily checked. As the mold is filled in one section, the set screw 26 is released and the mold rotated a limited amount to receive the next charge. When the tape masked portion 40 is reached, the tape is merely pulled off. The vacuum holds the cores in place, even when the originally loaded cores pass down to the underside position of FIG. 1. Loss of vacuum in this system, however, may cause the bottom cores to fall out, which must be guarded against. FIG. 4 illustrates the tape sealing arrangement in another view. In FIG. 3, the inspection having been completed, the mold cores 39 are pushed in, row by row, by the operator. This is possible, of course, only after the entire disc insert 29 is removed from the mold. The mold must be turned to the position wherein shaft 14 is vertical before this is done, also. Otherwise, the bottom mold cores would fall out. This is accomplished by either providing a pivotal mounting as shown in FIG. 1 or by keeping the vacuum on the mold, releasing the set screw 13 and then putting the mold in a vertical position on the mounting surface 23, resting on the underside of base plug 11.

When the vacuum connection 29 has been removed, the pour plate may be fitted into recess 21, the top of the mold fitted over the ring 16 to seal the cores therein, and the casting process carried out as set forth in my application Serial No. 721,491, supra.

From the foregoing it will be seen that this invention is one well adapted to attain all of the ends and objects hereinabove set forth together with other advantages which are inherent to the methods and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. In combination, a casting mold having a substantially circular base plate mounting a peripheral circumferential flange extending substantially normal to said base plate, defining a mold cavity therewithin, and having a plurality of small diameter holes extending through said flange, and a mold core loading device comprising a vacuum cap of greater area than that enclosed by said casting mold peripheral flange and formed to overlie in air tight contact at least a portion of the entire side of flange, a first projection ring on one side of said cap of such size and so formed as to frictionally fit within said flange and abut it circumferentially above the holes therein away form said base plate, a second projection ring on the side of the first ring away from said cap extending from a level above the top flange holes to a level below the bottom flange holes next to the base plate, said second projection ring being inwardly spaced from the inner face of said flange the distance it is desired to extend the mold cores into the cavity, an opening through said cap and rings, and a vacuum connection to said opening.

2. A device as in claim 1 wherein said opening is central of said cap and rings.

3. A device as in claim 1 wherein said cap completely overlies the top edge of said flange.

4. A device as in claim 1 wherein said cap and rings are formed integral.

5. A device as in claim 1 including means for supporting the mold in a position where the flange holes are substantially in a vertical plane, and means for permitting rotation of said mold in said position.

6. A device as in claim 1 including means for masking a portion of the flange holes before filling thereof with mold cores.

7. In combination, a casting mold having a substantially circular base plate mounting a peripheral circumferential flange, said flange extending substantially normal to said base plate, defining a mold cavity therewith, and having a plurality of small diameter holes extending through said flange, and a mold core loading device for use in connection with said casting mold comprising means circumferentially enclosing one side of said mold flange, including all of said small diameter holes extending therethrough, and a vacuum connection to said enclosing means whereby to draw air through said holes into said enclosing means and out through said vacuum connection.

References Cited in the file of this patent
UNITED STATES PATENTS

| | | |
|---|---|---|
| 1,038,682 | Thompson | Sept. 17, 1912 |
| 1,501,338 | Henry | July 15, 1924 |
| 2,223,220 | McClintock | Nov. 26, 1946 |
| 2,412,786 | Tucker | Dec. 17, 1946 |
| 2,445,141 | Hardy | July 13, 1948 |